United States Patent [19]
Minuto
[11] 4,264,369
[45] Apr. 28, 1981

[54] IMAGE TRANSFER MEDIUM

[76] Inventor: Maurice A. Minuto, 15 Hemingway Dr., Dixhill, N.Y. 11746

[21] Appl. No.: 84,078

[22] Filed: Oct. 12, 1979

[51] Int. Cl.$^3$ .................... C08L 1/08
[52] U.S. Cl. .................... 106/180; 106/186; 106/189; 106/197 R
[58] Field of Search .................... 106/180, 186, 189, 197; 427/146; 260/30.8

[56] References Cited

U.S. PATENT DOCUMENTS

| | | | |
|---|---|---|---|
| 2,545,174 | 3/1951 | Sido | 106/186 |
| 2,678,284 | 5/1954 | Holt | 260/30.8 R |
| 2,840,485 | 6/1958 | Greminger | 106/197 R |

*Primary Examiner*—Theodore Morris

[57] ABSTRACT

A novel composition of matter for use as image transfer medium in the form of a viscous or semi-viscous solution. The composition basically consists of water, a thixotropic agent (e.g., hydroxyethyl cellulose), sulfonamide (e.g., toluene sulfonamide), 2-ethyl 1,3-hexanediol and propylene glycol ester of sebacic acid.

12 Claims, No Drawings

IMAGE TRANSFER MEDIUM

BACKGROUND OF INVENTION

This invention relates to an image transfer medium and is particularly related to a composition of matter in the form of a viscous or semi-viscous fluid for such purpose.

Putty-like substances have been widely marketed by the toy industries for approximately 25 years. Due to their elasticity non-toxicity and other desirable attributes, these silicone substances, which are commonly referred to "silly-putty" or "bouncing putty" are used largely by children to bounce it, stretch it, form it into various shapes and press it against printed matter to transfer the print (e.g., cartoons and other pictorial illustrations) onto the surface of the putty. Examples of such putty-like substances are describedin U.S. Pat. No. 3,350,344 issued to Melvin D. Beers on Oct. 31, 1967 and U.S. Pat. No. 3,661,790 issued to Dean et al on May 9, 1972. In addition to their bouncing ability, some bouncing putties also exhibit the ability to glow in the dark after exposure to a light source.

While the presently marketed bouncing putty can be used to transfer images and prints onto its surface when pressed against the printed matter, these images cannot be transferred to another sheet or surface since the silicone putty does not release the ink from its surface.

It has now been found that such image transfer may be facilitated by first spreading and rubbing onto a transfer sheet or surface, a fluid media having the composition hereinafter described and then pressing the putty thereon with its imaged surface firmly pressed against the transfer sheet or surface. One such composition is disclosed in copending application Ser. No. 071310, filed Aug. 30, 1979. The present invention constitutes further improvement in such compositions.

It is accordingly an object of this invention to provide a fluid medium for transferring prints and images from one surface to another by using bouncing putties.

It is a further object of this invention to provide a novel composition of matter in the form of a viscous or semi-viscous fluid which, when rubbed onto a surface such as the human skin or onto a sheet of paper, permits images imprinted on silicone putty to be transferred on such sheets or surfaces.

It is also an object of this invention to provide such image transfer fluid medium which is non-toxic, non-irritating and free from adverse or harmful effects for use by children with silly putties for the aforementioned purposes.

SUMMARY OF INVENTION

Images imprinted on putty-like substances may be transferred onto another surface (e.g., a sheet of paper or the human skin) when such surfaces are coated with an image transfer medium having the composition described herein. The image transfer medium which is made as a viscous or a semi-viscous fluid basically consists of water, a thixotropic agent, preferably hydroxyethyl cellulose, a water soluble glycol, preferably 2-ethyl 1,3-hexanediol and propylene glycol ester of sebacic acid. The silicone putty-like substance is first pressed against the printed matter to form an image on the surface of the putty. The image transfer medium is then applied by rubbing it onto a sheet of paper or the skin. When the putty is pressed aginst such sheet or skin, a clear image of the printed matter is transferred thereto and is imprinted thereon.

DETAILED DESCRIPTION OF INVENTION

When a fluid medium having the composition hereinafter described is applied to a sheet of paper or to the surface of the human skin, prints and images produced on the surface of putties can be transferred and reproduced on such sheets or surfaces by pressing the putty against them.

The novel image transfer medium or composition of this invention basically consists of the following ingredients, wherein all parts are by weight:

(1) water;

(2) from about 1 to about 3 parts of a thickening agent per 100 parts of water, wherein the thickening agent is hydroxyethyl cellulose or carboxymethyl cellulose (CMC), although hydroxyethyl cellulose is preferred;

(3) from about 2 to about 10 parts of a mixture per 100 parts of water, wherein said mixture consists of the following ingredients:

(a) from about 70 to about 80 weight percent sulfonamide having the general formula:

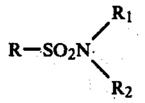

wherein R is an alkyl, aryl, alkaryl or aralkyl radical in which the alkyl moiety contains 1 to 4 carbon atoms; $R_1$ and $R_2$ each is is hydrogen or an alkyl radical having 1 to 8 and preferably 1 to 3 carbon atoms, or it is a cyclohexyl radical, e.g., cyclohexane, and wherein $R_1$ and $R_2$ may be the same or different moieties.

Exemplary sulfonamides include orthotoluene sulfonamide, paratoluene sulfonamide, N-ethyl orthotoluene sulfonamide, N-ethyl paratoluene sulfonamide, N-cyclohexyl paratoluene sulfonamide, or mixtures thereof. Toluene suflonamide has been found to be the most preferred and effective sulfonamide in the practice of this invention.

(b) from about 15 to 25 of a water-insoluble alkylene glycol having 5 to 8 carbon atoms, e.g., pentylene glycol, hexylene glycol, heptylene glycol or octylene glycol, or mixtures thereof, with hexylene glycol and octylene glycol constituting the preferred glycols.

In lieu of the glycols, or in admixture therewith, 2-ethyl 1,3-hexanediol or other diols be employed efficaciously with 2-ethyl, 1,3-hexanediol constituting the most preferred diol.

(c) from about 5 to about 10 weight percent of an ester produced by the reaction of alkylene glycol (e.g., ethylene glycol or propylene glycol) with a dicarboxylic acid (e.g., adipic acid, glutaric acid or sebacic acid). The ester of choice in the practice of this invention is propylene glycol ester of sebacid acid.

In another embodiment of this invention, the relative amounts of ingredients (a) and (b) may be reversed while maintaining the other ingredients in substantially the same relative amounts. Thus, and in such embodiment, the amount of sulfonamide may vary from about 15 to about 25 weight percent (based on the combined weight of the mixture of a, b and c) while the amount of diol may vary from about 70 to about 80 weight percent of such mixture.

In one typical formulation, 1.3 parts of hydroxyethyl cellulose (manufactured and sold by Hercules Company as Hercules 250 HHR) was added to 100 parts of water and the mixture was agitated in a laboratory blender. Within 10 minutes the mixture became somewhat viscous but still retained its ability to flow. Thereafter 6 parts by weight of the following mixture was added to the resulting solution:

| | | |
|---|---|---|
| (a) | Toluene sulfonamide* | 75 wt. % |
| (b) | 2-ethyl 1,3-hexanediol | 20 wt. % |
| (c) | Propylene glycol ester of dicarboxylic acid** | 5 wt. % |

*Sold by the Monsanto Company as Sensitizer 8**Sold by the Rhom & Haas Company as Paraplex G 25

The foregoing ingredients were mixed at ambient conditions until a homogeneous fluid was obtained which, typically, had the consistency of maple syrup.

The image transfer fluid made according to this invention may be applied to a sheet of paper or to the human skin by dipping a piece of cloth or an applicator swab therein and then spreading and rubbing it onto such surfaces. It is non-toxic, non-irritating and has no discermible harmful effect.

In a typical application, a portion of an image transfer fluid made as aforesaid was applied to a sheet of paper while another portion was applied by rubbing it onto the forearm of a human body. A commercially available bouncing putty was pressed against a printed matter for few seconds thereby forming an image of the prints on the putty surface. When the putty was pressed against the sheet of paper and the forearm, a clear image of the printed matter was imprinted on both surfaces.

What is claimed is:

1. An image transfer medium for reproducing printed matter which has been imprinted on the surface of putty-like substances, said image transfer medium comprising water; from about 1 to about 3 parts per 100 parts of water of a thixotropic agent selected from the group consisting of hydroxyethyl cellulose and carboxymethyl cellulose; from about 2 to about 10 parts per 100 parts of water of a mixture consisting essentially of:

(a) from about 70 to about 80 weight percent based on said mixtures of a sulfonamide having the general formula

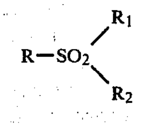

wherein R is an alkyl, aryl, alkaryl or aralkyl radical in which the alkyl moiety contains 1 to 4 carbon atoms, $R_1$ and $R_2$ each is hydrogen or an alkyl radical having 1 to 8 carbon atoms, or a cyclohexyl radical, and wherein $R_1$ and $R_2$ are the same or different moieties;

(b) from about 15 to about 25 weight percent based on said mixture of an alkylene glycol having 5 to 8 carbon atoms, a diol, or a mixture thereof, and (c) from about 5 to about 10 weight percent based on said mixtures of an ester produced by the reaction of an alkylene glycol and a dicarboxylic acid.

2. An image transfer medium as in claim 1 wherein said thixotropic agent is hydroxyethyl cellulose.

3. An image transfer medium as in claim 1 wherein said sulfonamide is paratoluene sulfonamide.

4. An image transfer medium as in claim 2 wherein said sulfonamide is paratoluene sulfonamide.

5. An image transfer medium as in claim 3 wherein said diol is 2-ethyl 1,3-hexanediol.

6. An image transfer medium as in claim 4 wherein said diol is 2-ethyl 1,3-hexanediol.

7. An image transfer medium as in claim 5 wherein said ester is propylene glycol ester of sebacic acid.

8. An image transfer medium as in claim 6 wherein said ester is propylene glycol ester of sebacic acid.

9. An image transfer medium as in claim 1 wherein said diol is 2-ethyl 1,3-hexane diol.

10. An image transfer medium as in claim 2 wherein said diol is 2-ethyl 1,3-hexanediol.

11. An image transfer medium as in claim 1 wherein said ester is propylene glycol ester of sebacic acid.

12. An image transfer medium as in claim 2 wherein said ester is propylene glycol ester of sebacic acid.

* * * * *